United States Patent [19]
Smith et al.

[11] Patent Number: 5,820,842
[45] Date of Patent: Oct. 13, 1998

[54] SILICON REFINING PROCESS

[75] Inventors: Jerald Smith, Kennesaw, Ga.; Stephen Johnson, Beaver, Pa.; Steven Oxman, Annapolis, Md.

[73] Assignee: Elkem Metals Company L.P., Sewickly, Pa.

[21] Appl. No.: 711,599

[22] Filed: Sep. 10, 1996

[51] Int. Cl.$^6$ .................................................. C01B 33/02
[52] U.S. Cl. ..................................... 423/348; 423/DIG. 5
[58] Field of Search ..................................... 423/348, 324, 423/DIG. 5; 117/932; 422/105, 129

[56] References Cited

U.S. PATENT DOCUMENTS

| | | | |
|---|---|---|---|
| 1,037,713 | 9/1912 | Allen | 423/348 |
| 4,249,988 | 2/1981 | Lavigna et al. | 156/605 |
| 5,021,221 | 6/1991 | Gould et al. . | |
| 5,244,639 | 9/1993 | Aratani et al. | 422/199 |

FOREIGN PATENT DOCUMENTS

| | | |
|---|---|---|
| 2515163 | 11/1980 | France . |
| 34 03 131 A1 | 8/1985 | Germany . |

OTHER PUBLICATIONS

Tuset, Johan. "Fundamental principles and data of relevans to the oxidative process," Nov. 13, 1994 Silicon & Ferrosilicon Refining Seminar Opryland Hotel, Nashville, TN U.S.A. Iron and Steel Society, Inc.

Tuset, Johan, "Carbon Refined Silicon", Nov. 13, 1994 Silicon & Ferrosilicon Refining Seminar Iron and Steel Society, Inc. Opryland Hotel, Nashville Tennesse USA.

Tuset, Johan. "Material and Heat Balance", Nov. 13, 1994 Silicon and Ferrosilicon Refining Seminar Iron and Steel Society, Inc. Opryland Hotel Nashville Tennessee USA.

Dosaj, Vishu. "Refining Program Lecture Notes", Nov. 13, 1994 Silicon and Ferrosilicon Refining Seminar Iron and Steel Society, Inc. Opryland Hotel, Nashville Tennesse USA.

Holta, Halvor. "Why the need for refining?", Nov. 13, 1994 Silicon and Ferrosilicon Refining Seminar Iron and Steel Society, Inc. Opryland Hotel, Nashville Tennessee USA.

Ritzer, Alan and Tabit, George E. "Strategic Alliance: Silicon Metal for Silicone Manufacturing", Jun. 1992 Conference on Silicon for Chemical Industry Geiranger, Norway.

"Expert System Boosts Process Output 15 Percent", PI Quality Jan./Feb. 1993, p. 34 by Ritzer et al.

Tuset, J. Kr. "Principles of Silicon Refining", Aug. 1985 International Seminar on Refining and Alloying of Liquid Aluminum and Ferro–Alloys, Trondheim Norway.

Tuset, J.Kr.; Ottem, L.; Livik, R. "Principles of Silicon Refining", Jun. 1992 Silicon for Chemical Industry, Edited by Øye and Rong Institute of Inorganic Chemistry 7034 Trondheim Norway.

Haaland, D.; Lindstad, L.H.; Tuset, J.Kr. "Use of Alkali Oxide Slags in Silicon Refining", Jun. 1994.

*Primary Examiner*—Gary P. Straub
*Assistant Examiner*—Timothy C. Vanoy
*Attorney, Agent, or Firm*—Bierman, Muserlian and Lucas

[57] ABSTRACT

The process calculates the amount of silica and oxidizing agent to use in a refining process for metallurgical-grade silicon. The calculation for silica takes into account (1) the aluminum content of the previous batch of refined silicon; (2) the calcium content of the previous batch of refined silicon; (3) the trend in the aluminum content of the unrefined silicon; and (4) the age of the ladle used for refining. The process then calculates the amount of silica based on a predetermined minimum amount of silica to add, a predetermined maximum amount of silica to add and the amount of silica added to the previous batch of refined silicon. The calculation for oxidizing agent is based on (1) the aluminum content of the previous batch of refilled silicon; (2) the calcium content of the previous batch of refined silicon; and (3) the age of the ladle. The process then calculates the amount of oxidizing agent to add based on a maximum amount of oxidizing agent to add and the amount of oxiziding agent added to the the previous batch of refined silicon. By following this process, an increase in the amount of chemical-grade silicon is obtained.

8 Claims, 6 Drawing Sheets

SILICON REFINING PROCESS

BACKGROUND OF THE INVENTION

1. Field of the Invention

This invention relates to a method for refining molten silicon and, more particularly, to an expert system for refining molten, metallurgical-grade silicon by oxidation to produce refined metallurgical-grade silicon.

2. Prior Art

Expert systems are generally defined as computer based software systems which incorporate knowledge, facts and reasoning to solve problems that were heretofore solved exclusively by humans. The computer allows for the manipulation of input data to arrive at an answer. The computer program is derived from a compilation of known methods and rules which have been synthesized into a single set of basic rules or algorithm. The computer applies these rules to the input data to arrive at an answer.

Refined metallurgical-grade silicon has a purity of greater than or equal to about 98.5% by weight silicon with a calcium content of less than or equal to about 0.05% by weight and an aluminum content of less than or equal to about 0.5% by weight. Refined metallurgical-grade silicon, also called chemical-grade silicon, is used to make products where the silicon must be of relatively high purity, e.g. silicones.

Conventionally, metallurgical-grade silicon is produced by the carbothermal reduction of quartz in an electric furnace. In order to refine the metallurgical-grade silicon, the molten silicon is tapped from the furnace into a refining vessel, typically a ladle, and subsequently refined in the ladle.

Refining of metallurgical-grade silicon is generally conducted on the liquid (molten) silicon either by oxidation or chlorination. The chlorination method has environmental problems associated with the use of chlorine and the emission of corrosive metal chlorides, thus the oxidation method is primarily used in the silicon industry.

The oxidation method typically employs the introduction of oxygen to the molten silicon. The oxygen is introduced to the molten silicon either in the form of a gaseous oxidizing agent or as a solid oxidizing agent. Introduction of gaseous oxidizing agents into the molten silicon include blowing oxygen gas or air at the surface of the molten silicon; or bubbling an oxygen containing gas through the molten silicon with a lance, nozzle or plug positioned in the bottom or side of the refining vessel. Solid oxidizing agents such as silica ($SiO_2$) are added to the melt from a hopper. A combination of both gaseous and solid oxidizing agents can also be used in the refining process. Some refiners employ gas in combination with a solid slag forming compound, a flux. The flux may also act as an oxidizing agent. Typically, refining by the oxidation process involves the addition of silica and/or gaseous oxygen into the molten silicon. Once the silicon has been refined, the refined molten silicon is cast into large blocks and crushed into powder for sale.

In the past, the amount of silica and/or oxygen added to the molten silicon in the ladle was determined by the individual process operators, who based their decision on their expertise. Such a procedure resulted in only about 60% of the refined metallurgical-grade silicon meeting the desired purity level. In other words, about 40% of the metallurgical-grade silicon which was refined fell outside the necessary purity level.

Standard metallurgical-grade silicon and refined metallurgical-grade silicon are reported to have has a typical analysis of:

| Elements Percent | Standard Metallurgical-grade | Refined Metallurgical-grade |
|---|---|---|
| Si | 97–99 | 98.5 |
| Al | 0.6 | 0.1–0.5 |
| Ca | 0.2 | 0.01–0.05 |
| Ti | 0.05 | 0.05 |
| C | 0.03 | 0.02 |
| Fe | 0.3–05 | 0.3–0.5 |
| Mn | 0.03 | 0.03 |
| V, Cr, Ni, Cu | 0.01–0.5 | 0.01–0.03 |
| Co, Mo, Zr | 0.005 | 0.005 |
| P | 0.005 | 0.005 |
| B | 0.005 | 0.004 |

There is a need to improve the silicon refining process so that a larger amount of the refined metallurgical-grade silicon meets the intended level.

SUMMARY OF THE INVENTION

An expert system has now been discovered for refining metallurgical-grade silicon using an oxidation process. This expert system is capable of increasing the output of refined metallurgical-grade compared to the conventional process. In fact, it has been found that the system of the present invention is capable of producing refined metallurgical-grade silicon over about 85% of the time. This is a substantial improvement to the 60% of the prior method.

The expert system of the present invention can employ conventional equipment operated in a conventional manner, however, the system of the present invention instructs the operator on the amount of silica and oxidizing agent to employ in the refining process.

The expert system of the present invention is specific for the refining vessel. It has been found that refining is dependent upon the configuration and make-up of the refining vessel. The expert system of the present invention utilizes the following steps:

(a) monitoring the temperature of the silicon in a ladle to determine when to start refining the molten unrefined silicon and when to cast the molten refined silicon;

(b) calculating the amount of silica to use for refining based on: (1) the aluminum content of a previous batch of refined silicon from said ladle, (2) the calcium content of a previous batch of refined silicon from said ladle, (3) the trend in the aluminum content of the unrefined silicon from the previous batches of silicon that were refined in said ladle, and (4) the age of the ladle; and (c) calculating the amount of oxidizing agent to use for refining based on: (1) the aluminum content of a previous batch of refined silicon from said ladle, (2) the calcium content of a previous batch of refined silicon from said ladle, and (3) the age of the ladle.

Employing this method, it has been found that the percentage of refined metallurgical-grade silicon increased from about 60% to above about 85%.

BRIEF DESCRIPTION OF THE DRAWINGS

These and other aspects of the present invention may be more fully understood by reference to one or more of the following drawings.

DESCRIPTION OF THE PREFERRED EMBODIMENTS

Figure 1:
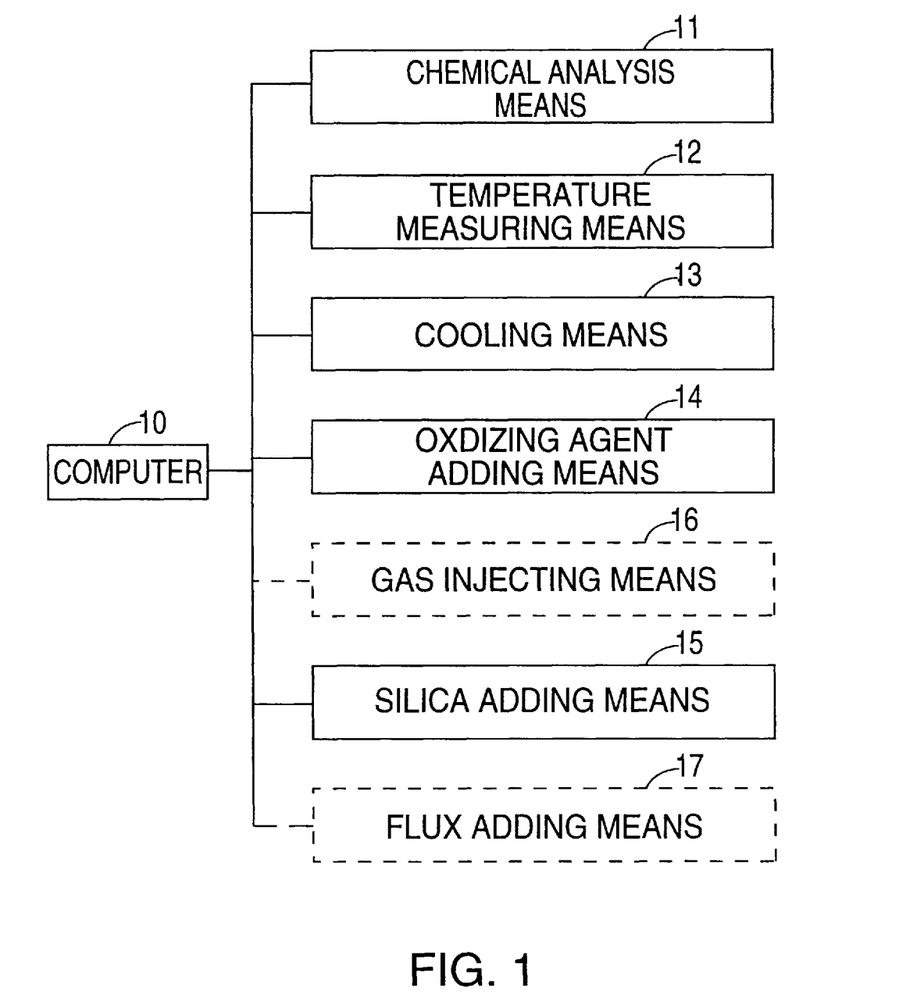
FIG. 1 illustrates the preferred components used in the system of the present invention.

Turning to FIG. 1, FIG. 1 illustrates an arrangement between the computer that controls the system and the various other elements of the system. The system comprises a computer 10 connected to a means 12 for chemical analysis of the silicon, means 14 for measuring the temperature of molten silicon in the ladle, means 15 for cooling the molten silicon in the ladle, means 16 for adding oxidizing agent to the molten silicon in the ladle, and means 18 for adding silica to the molten silicon in the ladle. Optionally, the system of the present invention can further comprise a means 19 for adding a flux to the molten silicon in the ladle. In a preferred embodiment, means 15 for cooling and means 16 for adding oxidizing agent are combined into means 16A for injecting gas into a ladle. In this preferred embodiment, a gas is used to cool the molten silicon and another gas is used as the oxidizing agent.

Computer 10 is a conventional computer with the capability of calculating and storing the data necessary to run the system.

Means 12 for conducting chemical analysis of the silicon is conventional laboratory instruments. The silicon is analyzed twice during the process. The silicon is analyzed when it is first tapped from the furnace. This is conventionally referred to as a lip analysis since the sample is taken from the lip or runner of the furnace. The second time the silicon is chemically analyzed is after the refining step. This is conventionally referred to as a chill analysis because it is conducted on a sample which is taken from the refined silicon as it is poured from the ladle and allowed to solidify.

Chemical analysis of the silicon is typically accomplished by physically transporting the samples, both lip and chill, to a laboratory, away from the ladle itself. The laboratory has conventional instruments capable of analyzing the silicon. The data from this analysis is then fed back to the computer.

Suitable instruments for analyzing the lip and chill analysis include x-ray fluorescence and induction coupled plasma. These are conventional pieces of equipment handled in a conventional manner.

Both the chill and the lip samples are analyzed for aluminum and calcium. These values are recorded based on weight percents. The term lip aluminum (L.Al.) and lip calcium (L.Ca.) as used herein means the weight percent of aluminum or calcium, respectively, in the unrefined molten silicon prior to refining as determined in the lip analysis. The term chill aluminum (C.Al.) and chill calcium (C.Ca.) as used herein means the weight percent of aluminum or calcium, respectively, in the refined silicon.

Means 14 for measuring the temperature of the silicon in the ladle is a conventional instrument which is operated in a conventional manner. Suitable results have been obtained with a temperature probe such as a disposable emersion thermal couple. The temperature of the silicon in the ladle is taken at several different; times. First, after the furnace has been tapped and the ladle filled, the temperature of the silicon in the ladle is taken to determine if the temperature of the silicon is appropriate for refining. Refining starts when the silicon has reached a temperature between about 3200° F. (1800° C.) and about 2500° F. (1400° C.). When the molten silicon is within this range, refining may start. The actual temperature at which the process of the present invention starts is also measured and entered into the system.

When the process is completed, the temperature of molten silicon is measured. If the temperature is above about 2750° F. (1500° C.) then the molten refined silicon is cooled and the temperature of the molten silicon monitored until it drops below about 2750° F. (1500° C.), at which time the molten silicon is at a suitable temperature for pouring and solidifying into an ingot.

Means 15 for cooling the molten silicon is any conventional means operated in a conventional manner. For example, if the cooling means is injection of a gas through a porous plug has been found to work well. If, on the other hand, the cooling means is the addition of a solid, then a hopper with a chute can be used to add the solid to the molten silicon. Suitable cooling gases include an inert gas, such as nitrogen. Suitable solid cooling agents include the oversized and undersized fines from a crushing operation of the refined metallurgical-grade silicon.

Means 16 for adding an oxidizing agent to the molten silicon is a conventional means operated in a conventional manner. For example, when the oxidizing agent is a gas such as oxygen, then a lance, nozzle or porous plug is used to inject the gas into the molten silicon. When the oxidizing agent is a solid such as silicon dioxide, a hopper equipped with a chute is used to add the solid oxidizing agent to the molten silicon. Suitable oxidizing agents include oxygen gas, carbon dioxide gas, air, mixtures of oxygen and nitrogen gases, silicon dioxide and combinations thereof.

Preferably, means 15 and means 16 are combined to a means 16A for injecting gas into the ladle and an inert gas is used to cool the molten silicon, e.g. nitrogen, and another gas is used as an oxidizing agent, e.g. oxygen.

Means 16A for injecting gas into the ladle for cooling and refining of the molten silicon is any conventional means which is operated in a conventional manner. Suitable means include a lance, nozzle or a porous plug. Preferably, a porous plug is affixed to the bottom of the ladle and connected to pumps and a source of gas. The cooling gas is preferably nitrogen gas while the refining gas is preferably a 50:50 mix of oxygen and nitrogen.

Means 18 for adding silica to the molten silicon in the ladle is any conventional means operated in a conventional manner. Preferably, a hopper with a chute that measures the appropriate amount of silica to be added is used in the system of the present invention. Preferably, the silica used in the present invention is sand containing 99.5% $SiO_2$ and having a mesh size between about 20 and about 150.

The means 19 for adding fluxes to the ladle is any conventional means operated in a conventional manner. Suitable means include a hopper with a chute that measures the appropriate amount of fluxes to be added to the ladle. Suitable fluxes include calcium oxide (lime, CaO), aluminum oxide ($Al_2O_3$), magnesium oxide (MgO), barium oxide (BaO), sodium oxide ($Na_2O$) and silicon dioxide ($SiO_2$). The use of fluxes is optional in the present invention.

As is known to one of skill in the art, lime (flux) and sand (oxidizing agent) can be used in combination to remove the aluminum from the molten silicon thereby resulting in a refined silicon with a lower aluminum content.

Additionally, as will be appreciated by those of skill in the art, silica can be replaced with a combination of oxidizing agent and a flux.

Figure 2:
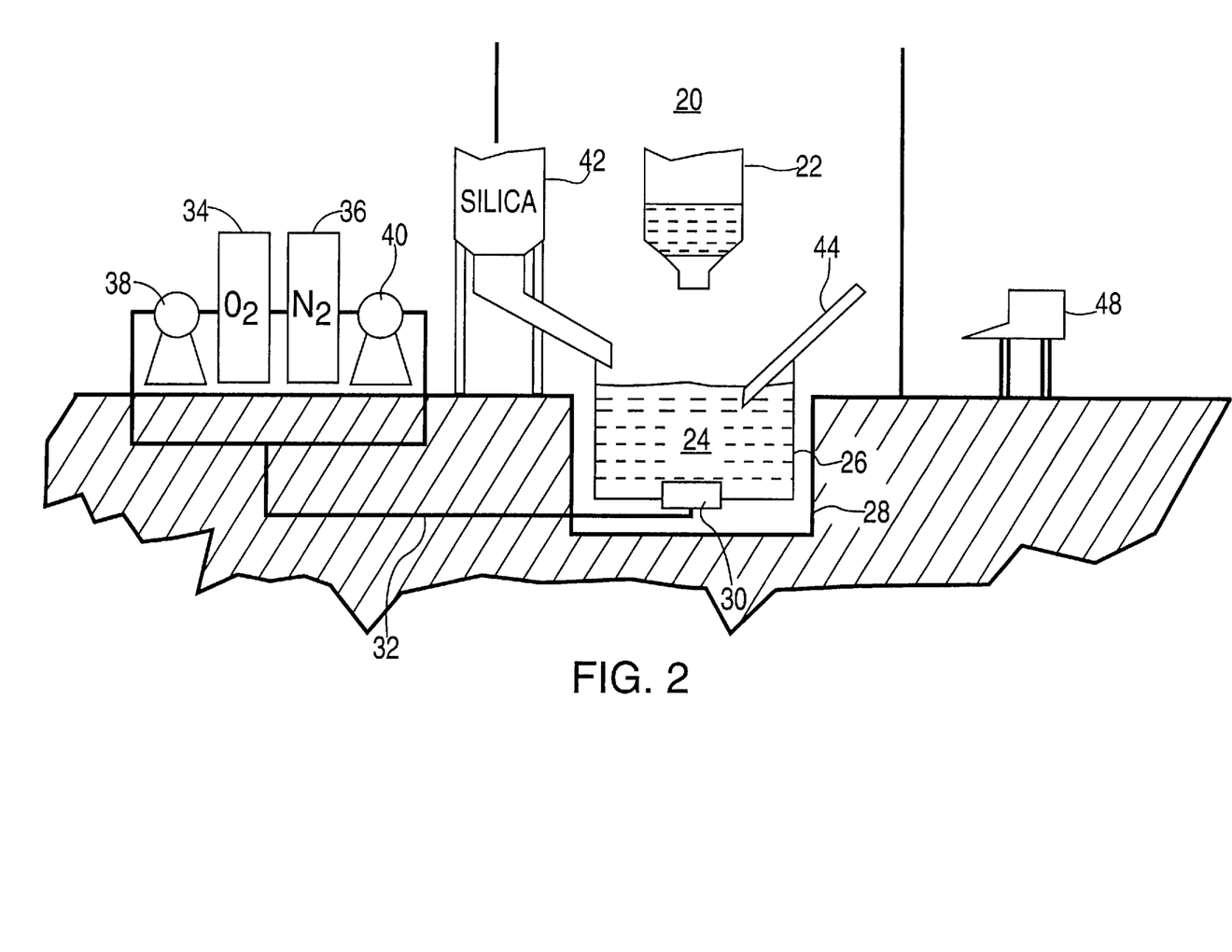
FIG. 2 illustrates a preferred ladle arranged for use in the present invention.

FIG. 2 illustrates a preferred embodiment of the present invention. Furnace 20 has tap hole 22 from which molten silicon 24 is tapped into ladle 26. Ladle 26 is recessed in hole 28 below tap hole 22. Ladle 26 is equipped with porous plug 30 which is connected by piping 32 to oxygen tank 34 and nitrogen tank 36. Each tank 34 and 36 has respective pumps 38 and 40 which are connected to a computer and which control the flow of their respective gases to ladle 26. Container 42 holds silica and is connected to the computer for metering in an amount of silica into ladle 26. Temperature probe 44 is a manually operated temperature probe which is inserted into molten silicon 24 to obtain its temperature. Computer 48 allows for the process operator of the ladle to input data and obtain information and run the system in general.

As will be explained in more detail below, in the preferred embodiment the operator has the ability to control the amount of silica added to ladle 26 as well as the amount of gas used for refining and the amount of gas used for cooling. Thus, the operator has the ability to override the amount of gas and the amount of silica recommended by the expert system of the present invention.

The chemical analysis is conducted by taking a sample of the molten silicon and transporting the sample to the lab for analysis.

Figure 3:
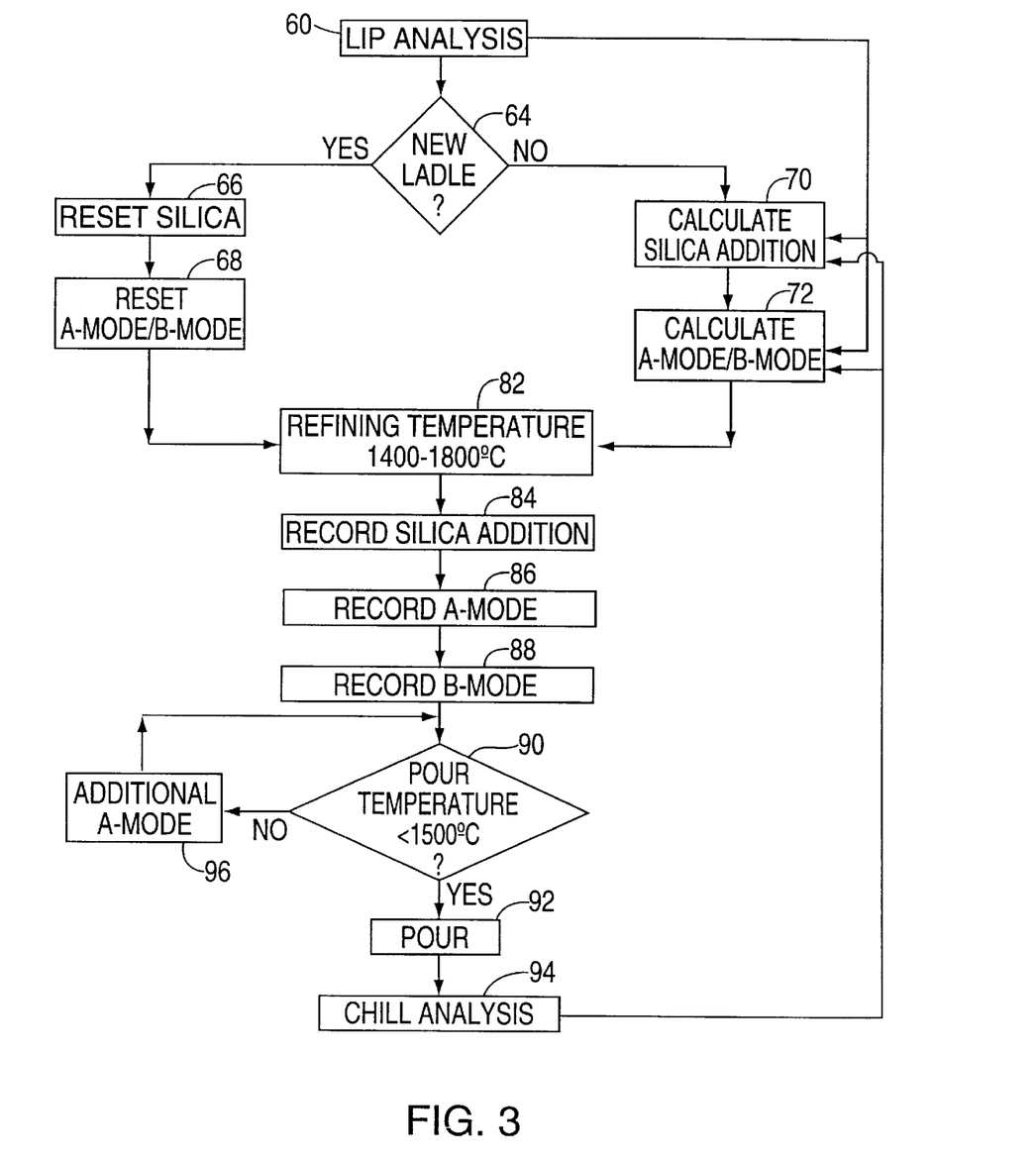
FIG. 3 illustrates the block diagram of the overall process.

The process of the present invention will now be described in reference to the block diagram as shown in FIG. 3. After the furnace is tapped and the ladle is filled, the operator must take the sample for the lip analysis, block 60.

Next, the operator must input whether the ladle is new or old, block 64. New ladles are ones that have just been relined. A ladle is new only once after relining; every time thereafter the ladle is old.

If the ladle is new, then the system resets the silica 66 to a predetermined value and resets the amount of cooling gas (referrd to as A-mode) and the amount of oxygen refining gas (referred to as B-mode) to a predetermined amount 68. The predetermined amounts of silica and cooling gas/refining gas are calculated based on the norm for the metallurgical-grade silicon which is refined in the process used in the facilities.

If the ladle is old, not new, then the system calculates the amount of silica 70 and calculates the amount of cooling gas/refining gas (A-Mode/B-Mode) to use to refine the metallurgical grade silicon. Next, the temperature of the melt is monitored to determine when it is between about 2500° F. (1400° C.) and about 3200° F. (1800° C.). Once the molten silicon reaches this temperature range, refining can start, block 82.

The operator then has the choice either to add the amount of silica which was calculated or to add the amount they decide is appropriate. In either case, the operator must record, 84 the amount of silica that is added to the ladle.

Likewise, the operator has the choice of either adding the amount of cooling gas and refining gas recommended by the system or to choose a different amount. In either case, the operator must record the amount of cooling gas (A-Mode) 86 and the amount of refining gas (B-Mode) 88 used in refining the metallurgical-grade silicon.

The temperature of the refined silicon is monitored to determine when it drops below about 2750° F. (1500° C.), 90.

Once the melt reaches a temperature of below about 2750° F. (1500° C.), the refined silicon is poured, block 92, and a sample taken for chill analysis, block 94. If the temperature of the melt is not below about 2750° F. (1500° C.), additional A-Mode (cooling) is employed, block 96, until the temperature of the melt is below about 2750° F. (1500° C.).

Both the chill analysis 94 and the lip analysis 60 are fed to block 70 and block 72 for use in calculating the amount of silica to use and calculating the amount of A-Mode/B-Mode to use in refining the metallurgical grade silicon.

It will be appreciated that lip analysis used in the process of the present invention is the analysis of the unrefined metallurgical-grade silicon which is in the ladle and being refined. In contrast, the chill analysis is the analysis of the previously refined silicon, the batch of silicon that immediately preceded the batch of unrefined metallurgical-grade silicon in the ladle.

The chemical analysis of a previous batch of refined silicon, chill analysis, or of the unrefined silicon, lip analysis, may not be available for use in the process. In the case where one or more of these chemical analyses are not available, the process employs the most recent previous analysis for the purposes of determining the time for A-Mode/B-Mode and the amount of silica to employ. In other words, if the chill analysis from the previous batch of refined silicon is not available, then the chill analysis from the next previous batch from that ladle is employed.

As should be appreciated, the efficiency of refining is based in part on the actual ladle used. Therefore, each measurement is indexed against a specific ladle, and each silica and A-Mode/B-Mode addition/calculation is ladle specific. In other words, in the present invention the analysis is ladle specific and not general for all ladles.

Additionally, ladles are not moved around between furnaces. A ladle is assigned to one furnace and will stay with that furnace until it is relined and a new ladle (relined ladle) is used in its place.

Figure 4:
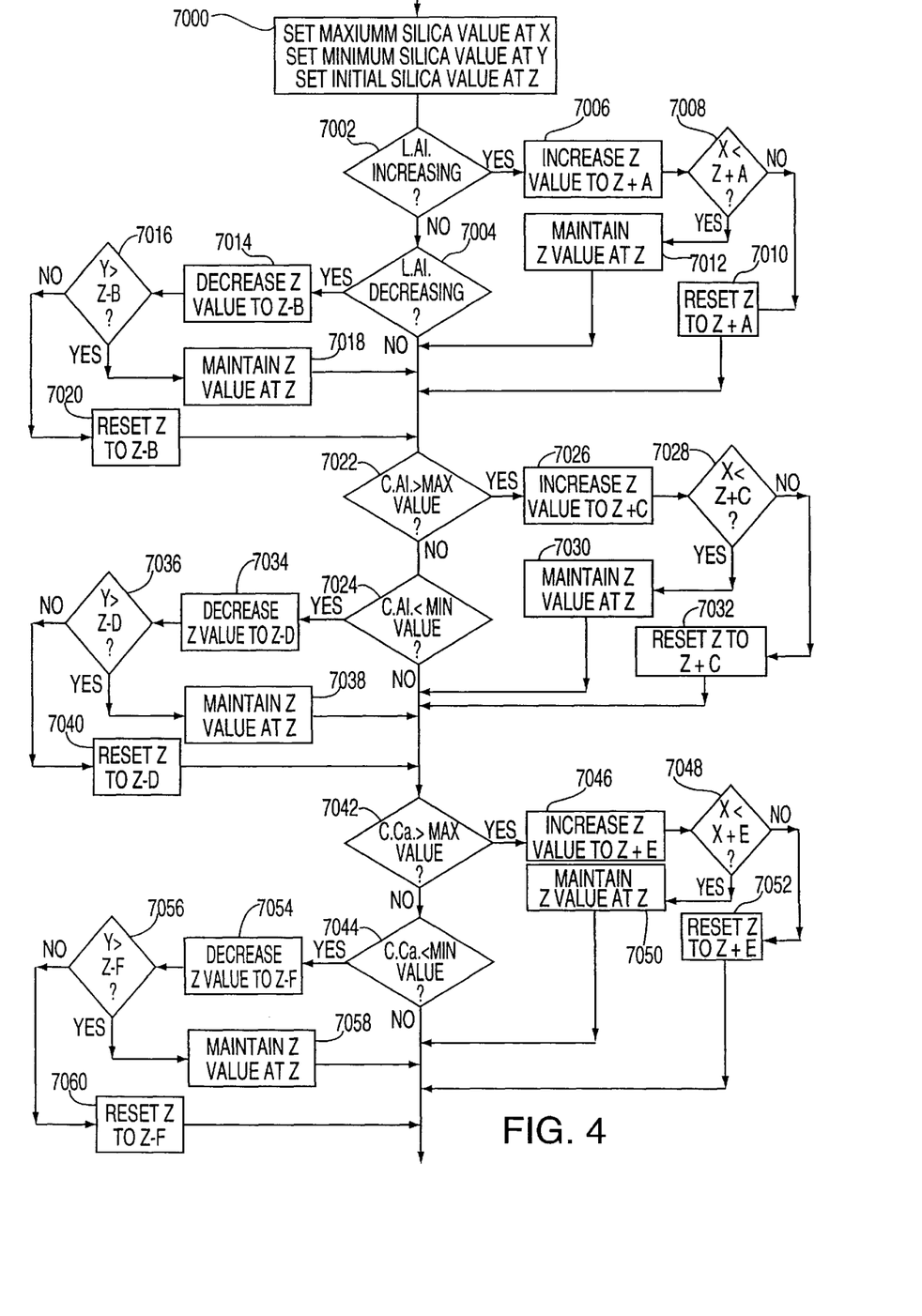
FIG. 4 illustrates a block diagram of a preferred method for calculating the amount of silica to employ.

Referring to FIG. 4, a preferred process for calculating the amount of silica to employ during refining when the ladle is old.

First, certain parameters are set in block 7000, namely the maximum amount of silica to be added is set at some value, say "X." The minimum amount of silica to be added during refining is set, say "Y" and the initial silica value is set, say "Z." The initial value, when the ladle is old, is the amount of silica used in the previous batch of refined silicon from that ladle. These numbers may vary from ladle to ladle and plant to plant. For starting of the expert system of the present invention, the initial amount is set at whatever value is usually used in the refining vessel. In other words, if an operator normally uses about 300 kg of silica, then the initial value is set at 300 kg and the expert system of the present invention will adjust the silica addition thereafter. The preferred maximum amount of silica is about 5% by weight of the molten silicon in the ladle. In other words, for a ladle that holds 10,000 pounds (4500 kg) of molten silicon, 500 pounds (225 kg) of silica is the maximum amount of silica to add to the ladle. The preferred minimum amount of silica is set at 0 pounds (0 kg). Mathematically, this is simply represented by the formula:

$$0 \leq \text{silica added} \leq 500 \text{ pounds (225 kg)}$$

In other words, no more than 500 pounds (225 kg) of silica may be added to the ladle during the refining process (unless operator decides to override the system).

When the ladle is new, then the system recommends using an amount of silica which is about 75% of the amount of silica used in the previous old ladle and resets the silica level to the 75% level, block 66 of FIG. 3.

Next, the trend in lip aluminum (L.Al.) is analyzed as to whether the trend in lip aluminum is increasing 7002 or decreasing 7004. If the lip aluminum is increasing then the set initial amount of silica is increased by a set amount say "AA" pounds, 7006. Then this increase must be checked against the maximum amount of silica, "X", 7008 to insure it has not gone above the maximum amount. If the increased silica amount, Z+A, is not greater than X, then the amount of silica to be added, Z, is reset to a value of Z+A, 7010. If X is less than Z+A, then the amount of silica added is maintained at Z, 7012.

If the answer in block 7002 is no, then the next question is whether the trend in lip aluminum (L.Al.) is decreasing, 7004. If the trend in lip alauminum is decreasing, then a set amount, say B, is subtracted from the initial amount of silica Z, 7014. Next, this amount of Z-B must be checked to insure it has not dropped below the minimum Y, 7016. If Z-B has dropped below the minimum Y, then the amount of silica to be added is maintained at Z, 7018. If the value of Z-B is not below Y, i.e. is equal to or greater than Y, then the value Z is reset to the amount of Z-B, 7020.

After the adjustment in the silica amount has been made based on the trend in lip aluminum, 7002–7020, the chill aluminum (C.Al.) is reviewed to determine if it is above a set maximum value 7022 or below a set maximum value 7024. These set values are dependent upon the amount of aluminum that is desired in the refined metallurgical-grade silicon. Preferably, these set values are a range established by the customer. In other words, the range may be, for example, 0.25 to 0.275, because the desired aluminum content in the refined silicon is between 0.25% and 0.275%. Thus, the set maximum value is 0.275% and the set minimum value is 0.25%. Where the chill aluminum is above the set maximum amount, then the amount of silica to be added, Z, is increased by an amount, say C, 7026.

Next, this increase, Z+C, must be checked, 7028, to determine if it is greater than the maximum amount of X. If the maximum amount X is less than Z+C, then the amount of silica added is maintained at Z, 7030. If, on the other hand, X is not less than Z+C, i.e. Z+C is less than or equal to X, then Z is reset to a value Z+C, 7032.

If the answer to block 7022 is no, then the next question is whether the chill aluminum (C.Al.) is below a set minimum value 7024. If the chill aluminum is below a set minimum value, then the silica amount, Z, is decreased by a set amount, D, 7034. Then this decrease must be checked against the minimum, Y, 7036, to insure that the decrease has not dropped below the minimum. If the minimum Y is greater than the decrease of Z-D, then the amount of silica to be added is maintained at Z, 7038. If, on the other hand, the minimum amount Y is not greater than the amount Z-D, i.e. Z-D is greater than or equal to Y, then Z is reset to the amount Z-D, 7040.

After the adjustment in the silica amount has been made based on the chill aluminum, 7022–7040, the chill calcium (C.Ca.) is reviewed to determine if it is above a set maximum value 7042 or below a set minimum value 7044. These set values are dependent upon the amount of calcium (calcium range) that is desired in the refined metallurgical-grade silicon.

Where the chill calcium is above the set maximum amount, 7042, then the amount of silica to be added, Z, is increased by an amount, say E, 7046. Next, this increase, Z+E, must be checked 7048 to determine if it is greater than the maximum amount of X, of silica that can be added to the molten silicon. If the maximum amount X is less than Z+E, then the amount of silica added is maintained at Z, 7050. If, on the other hand, X is not less than Z+E, i.e. Z+E is less than or equal to X, then Z is reset to a value of Z+E, 7052.

If the answer to block 7042 is no, then the next question is whether the chill calcium (C.Ca.) is below a set minimum value 7044. If the chill calcium is below a set minimum value, then the silica amount, Z, is decreased by a set amount, F, 7054. Then this decrease must be checked against the minimum, Y, 7056, to ensure that the decrease has not dropped below the minimum. If the minimum Y is greater than the decrease of Z-F, then the amount of silica to be added is maintained at Z, 7058. If, on the other hand, the minimum amount Y is not greater than the amount Z-F, i.e. Z-F is greater than or eual to Y, then Z is reset to the amount Z-F, 7060.

The set values in blocks 7022, 7024, 7042 and 7044 can vary depending on the product and the equipment used to refine the silicon. Also the values A, B, C, D, E and F will vary.

It should be noted that if the aluminum level or the calcium level in the unrefined silicon, i.e. the unrefined metallurgical-grade silicon is acceptable, then there is no need to perform each of the steps in the silica adjustment. In other words, if the aluminum content in the unrefined silicon is acceptable for the refined silicon, then blocks 7002–7040 are by-passed and only blocks 7042–7060 are used to adjust the silica amount.

Applicants have also found that it is preferred to increase the number of steps for adjusting the silica amount based on either chill aluminum or chill calcium. For instance, the steps represented in blocks 7022–7040 are repeated except that the set values in blocks 7022 and 7024 are change and the value of C, block 7026 and D, block 7034 are change.

Figure 6:
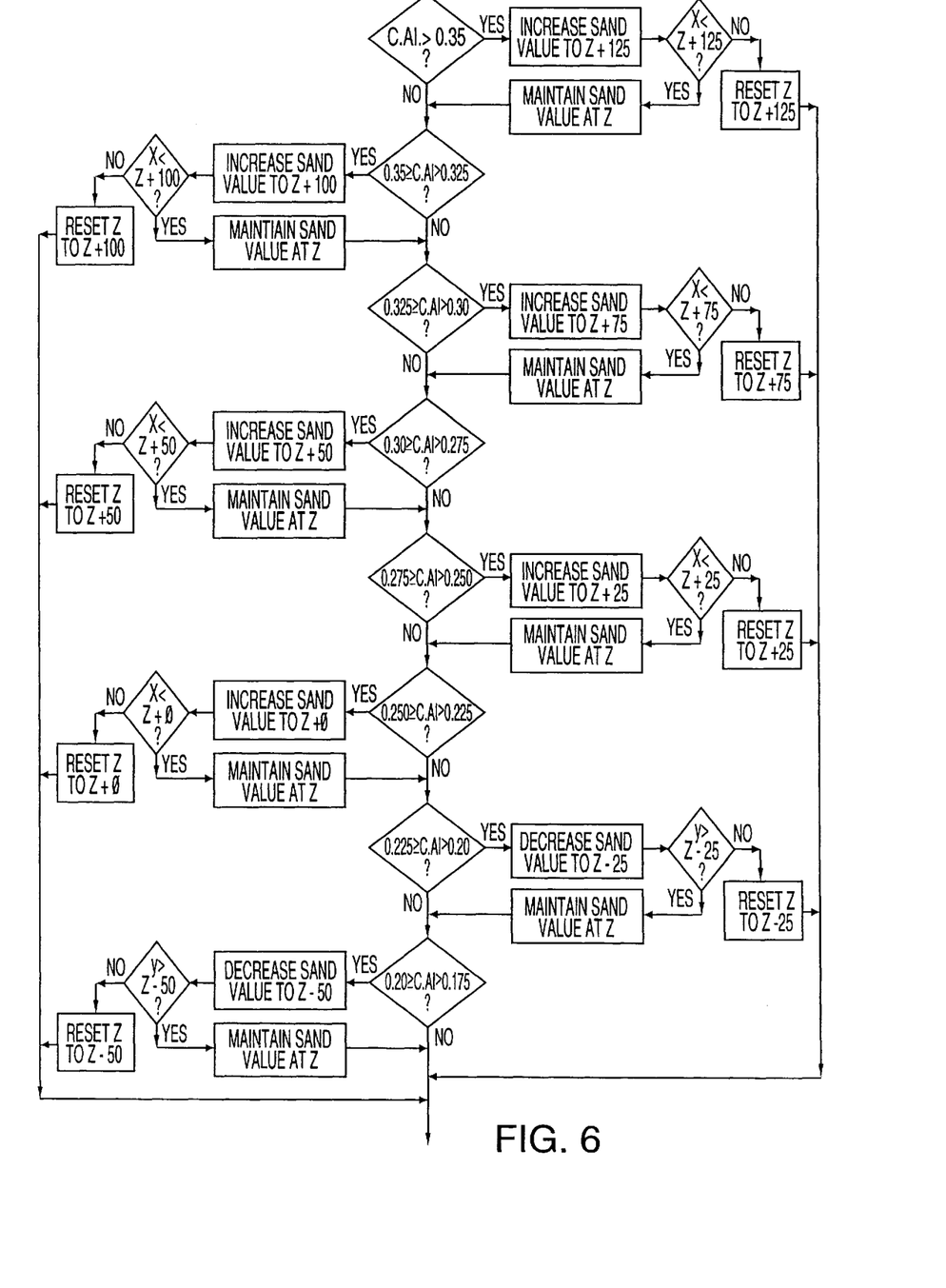
FIG. 6 illustrates another preferred manner for calculating the amount of silica to employ.

This aspect of increasing the number of calculations or decisions for the adjustment to the silica amount is shown in FIG. 6 with respect to the adjustment made for chill aluminum and will be gone into in more detail below.

Figure 5:
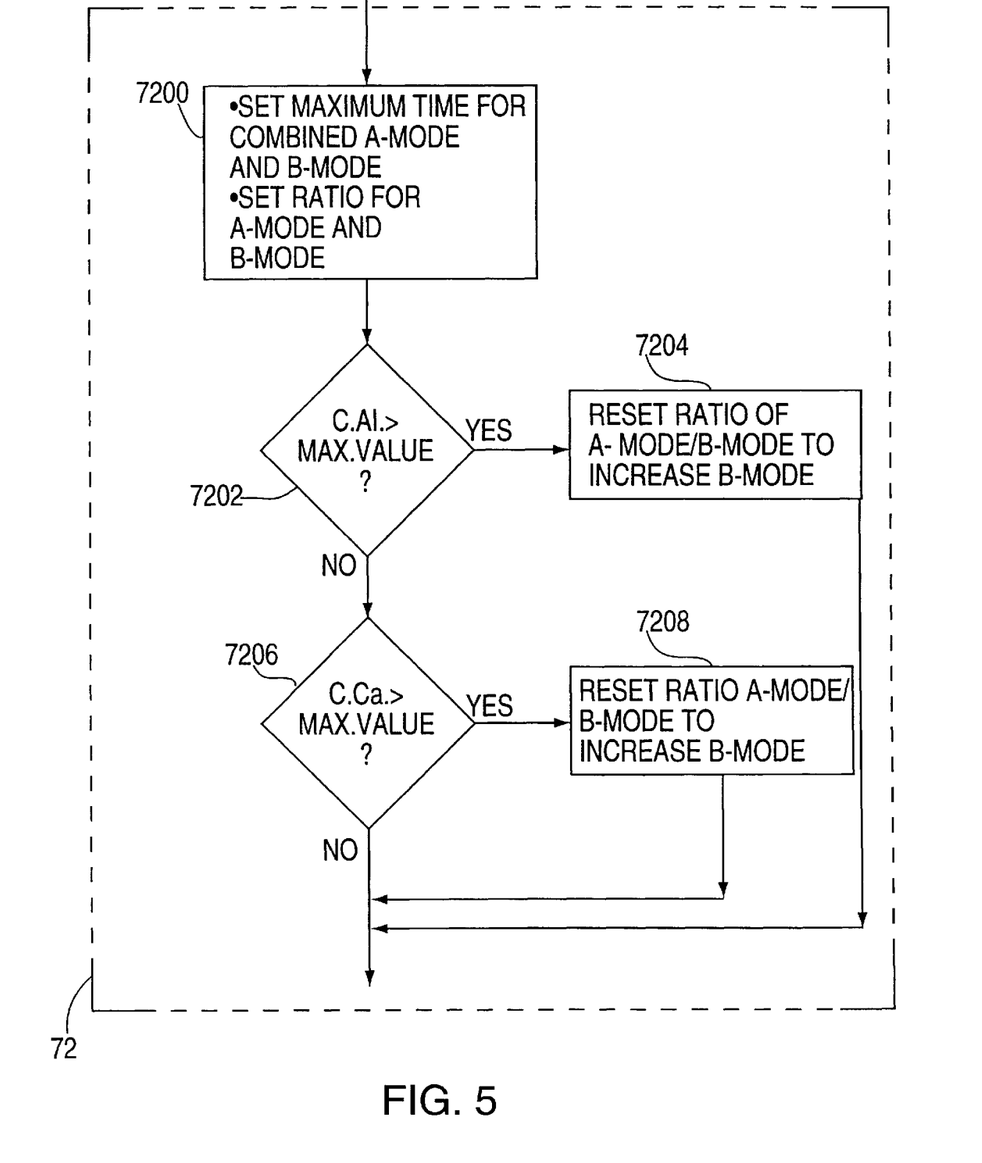
FIG. 5 illustrates a block diagram of a preferred method for calculating the amount of oxidizing gas and cooling gas to use in the present invention.

Referring to FIG. 5, a preferred process for calculating the amount of A-Mode, cooling gas, and B-Mode, oxygen gas, to employ during refining will now be outlined.

First, certain parameters are set, namely, the maximum time for the combined A-Mode and B-Mode and the ratio of A-Mode and B-Mode, 7200. These parameters may take the form of time (minutes) or volume of gas (cubic feet) supplied to the ladle during refining. Applicants have had good results using time and have found that a maximum time of 75 minutes works well. The ratio of A-Mode to B-Mode allows for changes in the amount of A-Mode and B-Mode supplied to the ladle without having the combined times for A-Mode and B-Mode exceed the maximum time for A-Mode and B-Mode.

Next, the chill aluminum (C. Al.) is analyzed to determine if it is greater than a set maximum value 7202.

If the chill aluminum is above a set maximum value then the ratio of A-Mode to B-Mode is adjusted to provide more B-mode, increase oxygen refining and the ratio is reset to the new ratio having the increase in B-Mode, 7204.

Next, the chill calcium (C. Ca.) is analayzed to see if it is above a set maximum value, 7206. If the chill calcium is above a set maximum value then the ratio of A-Mode to B-Mode is adjusted to increase the amount of B-Mode, 7208, and the ratio of A-Mode to B-Mode reset to this new ratio.

The set maximum values used in blocks 7202 and 7206 are chosen beforehand and are dependent on the desired levels of calcium and aluminum in the refined silicon.

EXAMPLE

The present invention will now be described with respect to refining a specific silicon.

This example illustrates making a refined metallurgical-grade silicon where the metallurgical silicon has a typical chemical analysis as outlined above and wherein the overall design of the system is similar to that depicted in FIG. 2. The ladle used in this example held approximately 10,000 pounds (4500 kg) of molten silicon. The silica employed is a sand having an $SiO_2$ content of 99.5% by weight. The initial amount of sand employed was 200 pounds (90 kg). A-Mode was defined as nitrogen gas which was supplied to the ladle in an amount of about 20 CFM and the B-Mode was defined as a 50/50 mix of oxygen and nitrogen gas which was supplied in an amount of about 40 CFM.

I. NEW LADLE

A. SAND

If the ladle is new, then the system recommends using an amount of sand which is equal to about 75% of the amount of sand used with the previous old ladle (0.75)(90 kg) or 70 kg) and resets the amount of sand to that level, block 66.

B. A-MODE/B-MODE

Next the system suggests the amount of time for A-Mode and B-Mode and resets the time for A-Mode and B-Mode, block 68. The maximum time for the combined A-Mode and B-Mode is about 75 minutes. The system recommends about 10 minutes of A-Mode, followed by about 45 minutes of B-Mode, followed by about 20 minutes of A-Mode. This is a ratio of 10/45/20 or 1/4.5/2.

These amounts and times can be employed by the operator, or if the operator chooses, he can change the amounts and times which are used for refining. In either case, the operator must enter into the computer the amount of sand and the amount of time on A-Mode and B-Mode since these numbers will be used to calculate the sand addition and the A-Mode and B-Mode times for the next batch of silicon that is refined in that ladle.

II. OLD LADLE

If the ladle is old, i.e. has been used at least once in the past for refining without having been relined, then the amount of sand and time employed for A-Mode and B-Mode are set by the trend in the lip analysis, the chill analysis, the amount of sand used in the previous batch and the time of A-Mode and B-Mode from the previous batch. The calculations for sand addition, block 70, and the calculations for A-Mode and B-Mode, block 72, using an old ladle are detailed below.

A. SAND

1. Maximum-Minumum Sand

The maximum amount of sand is about 500 pounds (225 kg) and the minimum is 0. Thus, the initial amount of sand added to a new ladle is recorded and each increase or decrease of sand to the initial amount is recorded. Mathematically, this is simply represented by the following:

$0 \leq$ sand added to the ladle $\leq 500$

In other words, no more than 500 pounds of sand may be added to the molten silicon during the refining process. When the sum of sand to be added reaches 500 pounds, then the amount of sand used in the refining process remains the same.

When the ladle is old, the sand calculation is based on three factors: the amount of sand added to the ladle for the previously refined silicon; the trend in the lip aluminum content of the previously unrefined silicon; and the chill aluminum content of the previously refined silicon.

The process starts a sand calculation based on the presumption that the same amount of sand as used in the previous batch of refined silicon from the ladle should be used again. This amount is called the initial amount, 200 lbs. (90 kg) for this example. Thus, the initial amount changes with each new refined batch, depending on the amount of sand added to the previous batch and the various chemical analyses. The initial amount changes depending on the trend in the lip aluminum and the aluminum content of the previous chill.

2. Lip Aluminum Adjustment

If the aluminum content of the unrefined silicon, as shown in the lip analysis for the previous three batches of silicon that were refined in the ladle, has increased each time, then about 25 pounds (10 kg) of sand is added to the initial amount. If, on the other hand, the aluminum content of the unrefined silicon, as shown in the lip analysis for the previous three batches of silicon that were refined in the ladle, has decreased each time, then about 25 pounds (10 kg) of sand is subtracted from the initial amount. If there have been neither three successive increases nor three successive decreases in the aluminum content shown by the lip analysis of the unrefined silicon, then the initial amount remains unchanged.

The trend in lip aluminum is based on a steady rise or a steady fall in lip aluminum. In other words, the rise or fall must be progressive for three consecutive batches. For example, a steady rise in lip aluminum is a first lip aluminum of 0.1, a second lip aluminum of 0.12, and a third lip aluminum of 0.14. A first lip aluminum of 0.1, a second of 0.12 and a third of 0.12 is not a steady rise. The same holds true for steady decrease.

3. Chill Aluminum Adjustment

Besides adjusting the initial amount of sand for the trend in lip aluminum, an adjustment is made for chill aluminum from the previous batch of refined silicon from the ladle. Based on the following table, the initial sand is increased or decreased depending on the chill aluminum from the previous batch of refined silicon from that ladle:

| Chill Aluminum (%) | Pounds of Sand Added to Initial Sand Amount | |
|---|---|---|
| | Increase | Decrease |
| Aluminum > 0.350 | 125 | — |
| 0.350 ≧ Aluminum > 0.325 | 100 | — |
| 0.325 ≧ Aluminum > 0.300 | 75 | — |
| 0.300 ≧ Aluminum > 0.275 | 50 | — |
| 0.275 ≧ Aluminum > 0.250 | 25 | — |
| 0.250 ≧ Aluminum > 0.225 | 0 | — |
| 0.225 ≧ Aluminum > 0.20 | — | 25 |
| 0.20 ≧ Aluminum > 0.175 | — | 50 |
| 0.175 ≧ Aluminum > 0.150 | — | 75 |
| 0.150 ≧ Aluminum > 0.125 | — | 100 |
| 0.125 ≧ Aluminum > 0.10 | — | 125 |
| 0.10 ≧ Aluminum > 0.075 | — | 150 |
| 0.050 ≧ Aluminum > | | 200 |

Using the table above, the amount of initial sand is adjusted along with the adjustment made for the trend in lip aluminum. FIG. 6 is a block diagram which illustrates how the system calculates the amount of sand to add in accordance with the first eight steps of the table above. As can be seen, the adjustment made based on the chill aluminum goes through a number of decisions to determine the correct amount of sand to add to the melt. In this example, the target aluminum content of refined silicon is between 0.25% and 0.275% by weight.

4. Chill Calcium Adjustment

The initial amount of sand is adjusted for the chill calcium of the previous batch of refined silicon from the ladle. The table below lists the chill calcium from the previous batch of refined silicon and the amount of sand added to the initial amount:

| Chill Calcium (%) | Pounds of Sand Added to Initial Sand Amount |
| --- | --- |
| Calcium ≧ 0.05 | 50 |
| Calcium 0.05 | 0 |

Using the table above, the amount of initial sand is adjusted.

It has been found that where the chill aluminum adjustment to the initial sand amount has been made, that the step for calcium adjustment may be eliminated. The maximum set value for calcium is 0.05% by weight. This value can be set at the acceptable level for the refined silicon and may vary. It has been found that the adjustment for the aluminum chill content is the most critical.

B. A-MODE/B-MODE

1. Maximum Time for Combined A-Mode and B-Mode

The total of A-Mode and B-Mode does not exceed about 75 minutes, e.g. it is impossible to have a negative amount of time for A-Mode and over about 75 minutes for B-mode.

2. Chill Aluminum Adjustment

With respect to A-Mode and B-Mode for an old ladle:
(i) If the chill analysis from the previous batch of refined silicon from the ladle had an aluminum content less than about 0.28% by weight (the middle of the second sand adjustment up from 0 for chill aluminum), then A-Mode and B-Mode are set at the previous A-Mode and B-Mode.
(ii) If the chill analysis from the previous batch of refined silicon from the ladle had an aluminum content equal to or greater than about 0.28% by weight, then about 10 minutes is added to B-Mode and an equal amount of time (about 10 minutes) is subtracted from A-Mode.

3. Chill Calcium Adjustment

With respect to A-Mode and B-Mode for an old ladle:
(i) If the chill analysis from the previous batch of refined silicon from the ladle had a calcium content less than about 0.05% by weight, then A-Mode and B-Mode are set at the previous A-Mode and B-Mode.
(ii) If the chill analysis from the previous batch of refined silicon from the ladle had a calcium content equal to or greater than about 0.05% by weight, then about 10 minutes is added to B-Mode and an equal amount of time (about 10 minutes) is subtracted from A-Mode. It has been found that where the chill aluminum adjustment to the initial sand amount has been made, that the step for calcium adjustment may be eliminated. The maximum set value for calcium is 0.05% by weight. This value can be set at the acceptable level for the refined silicon and may vary. It has been found that the adjustment for the aluminum chill content is the most critical.

It will be understood that the claims are intended to cover all changes and modifications of the preferred embodiments of the invention herein chosen for the purpose of illustration which do not constitute a departure from the spirit and scope of the invention.

What is claimed is:

1. A process for refining molten metallurgical-grade silicon into chemical-grade silicon comprising:
   (a) inserting molten unrefined silicon into a ladle;
   (b) allowing said molten unrefined silicon to cool to a temperature in the range of about 2500° F. to about 3200° F.;
   (c) refining said molten unrefined silicon when said molten unrefined silicon has reached a temperature in the range of about 2500° F. to about 3200° F.;
   (d) calculating the amount of silica to use for refining said molten unrefined silicon based on:
      (1) the aluminum content of a previous batch of refined silicon from said ladle,
      (2) the calcium content of a previous batch of refined silicon from said ladle,
      (3) the trend in the aluminum content of the unrefined silicon from the previous batches of silicon that were refined in said ladle,
      (4) the age of the ladle,
      (5) a minimum amount of silica to be added to the unrefined silicon during refining,
      (6) a maximum amount of silica to be added to the unrefined silicon during refining, and
      (7) an initial amount of silica to be added to the unrefined silicon during refining, said initial amount being the amount of silica added to the previous batch of refined silicon from said ladle;
   (e) adding the calculated amount of silica to the molten silicon during refining and recording the calculation;
   (f) calculating the amount of oxidizing agent to use for refining the unrefined molten silicon based on:
      (1) the aluminum content of a previous batch of refined silicon from said ladle,
      (2) the calcium content of a previous batch of refined silicon from said ladle,
      (3) the age of the ladle,
      (4) a maximum amount of oxidizing agent to be added to the unrefined silicon during refining, and
      (5) an initial amount of oxidizing agent to be added to the unrefined silicon during refining, said initial amount of oxidizing agent being the amount of oxidizing agent added to the previous batch of refined silicon from said ladle;
   (g) adding the calculated amount of oxidizing agent to the molten silicon during the refining;
   (h) cooling the molten silicon to about 2750° F. if the molten silicon has a temperature above about 2750° F. after refining; and
   (i) recovering the molten silicon after refining after said molten silicon has reached a temperature below about 2750° F.

2. The process of claim 1 wherein said oxidizing agent is gaseous oxygen and said step of adding the oxidizing agent comprises injecting gaseous oxygen into said molten silicon by means of a porous plug.

3. The process of claim 1 wherein cooling the molten silicon to about 2750° F. comprises injecting an inert gas into said molten silicon by means of a porous plug.

4. The process of claim 1 wherein cooling the molten silicon to about 2750° F. comprises adding a solid cooling agent to said molten silicon by means of a hopper and chute.

5. The process of claim 1 wherein said step of calculating the amount of silica to be added increases the amount of silica to be added if the trend in aluminum content of unrefined silicon is increasing; decreases the amount of silica to be added if the trend in aluminum content of unrefined silicon is decreasing; prevents the increased amount of silica to be added from being greater than the maximum amount of silica to be added; and prevents the decreased amount of silica to be added from being less than the minimum amount of silica to be added.

6. The process of claim 1 wherein said step of calculating the amount of silica to be added increases the amount of silica to be added if the calcium content of the previous batch of refined silicon is increasing; decreases the amount of silica to be added if the calcium content of the previous batch of refined silicon is decreasing; prevents the increased amount of silica to added from being greater than the maximum amount of silica to be added; and prevents the decreased amount of silica to be added from being less than the minimum amount of silica to be added.

7. The process of claim 1 wherein the step of calculating the amount of oxidizing agent to be added increases the amount of oxidizing agent if the aluminum content of the previous batch of refined silicon is greater than a predetermined maximum value and prevents the increased amount of oxidizing agent to be added from being greater than the maximum amount of oxidizing agent to be added.

8. The process of claim 1 wherein the step of calculating the amount of oxidizing agent to be added increases the amount of oxidizing agent if the calcium content of the previous batch of refined silicon is greater than a predetermined maximum value and prevents the increased amount of oxidizing agent to be added from being greater than the maximum amount of oxidizing agent to be added.

* * * * *